United States Patent [19]
Ocerin

[11] Patent Number: 5,257,161
[45] Date of Patent: Oct. 26, 1993

[54] COUPLING SYSTEM FOR ELECTRIC SWITCHGEAR MODULES IN TRANSFORMATION CENTERS AND THE LIKE

[76] Inventor: Javier O. Ocerin, Barrio Mendieta, 48330 Lemona - (Vizcaya), Spain

[21] Appl. No.: 907,918

[22] Filed: Jun. 26, 1992

[30] Foreign Application Priority Data

Jun. 26, 1991 [ES] Spain ................... 910510

[51] Int. Cl.⁵ ............... H02B 7/01; H01R 13/74; H01R 11/09
[52] U.S. Cl. .................. 361/605; 361/633; 439/559; 439/723
[58] Field of Search .............. 439/181, 183–187, 439/559, 723, 787, 788, 794; 200/50 AA, 148 R, 148 B, 148 D; 174/152 R, DIG. 10, 11 BH, 12 BH, 14 BH, 15.3, 18, 142; 361/333, 335, 336, 338, 352, 393, 394

[56] References Cited
U.S. PATENT DOCUMENTS

| | | | |
|---|---|---|---|
| 3,713,075 | 1/1973 | Clark | 174/99 E X |
| 4,703,234 | 10/1987 | Kato | 439/184 X |
| 4,767,351 | 8/1988 | Patel et al. | 174/152 R X |
| 4,782,197 | 11/1988 | Stunzi et al. | 174/152 R |
| 4,791,247 | 12/1988 | Cacalloro et al. | 174/152 R |
| 4,927,982 | 5/1990 | Wight et al. | 174/152 R X |
| 4,990,723 | 2/1991 | Ziberna et al. | 174/152 R |

*Primary Examiner*—Leo P. Picard
*Assistant Examiner*—Michael W. Phillips
*Attorney, Agent, or Firm*—Helfgott & Karas

[57] ABSTRACT

A coupling system for coupling switchgear modules comprises cover-guards wherein the cover-guards of two adjacent modules to be coupled to each other face each other. The cover-guards have enlarged portions which are received in the holes of two modules and are sealed to the modules by O-rings. Each cover-guard has at a base thereof a hole in which a contactor member having a tab is fixed and sealed such that two tabs in two adjacent modules lie in coaxial opposition. The system further includes an insulating mount which is simultaneously plugged into both cover-guards and provided in its hollow interior with a metal tubing member in which are housed a number of conductive elements that tend to grip the conductive tabs by action of circular springs or coils.

3 Claims, 2 Drawing Sheets

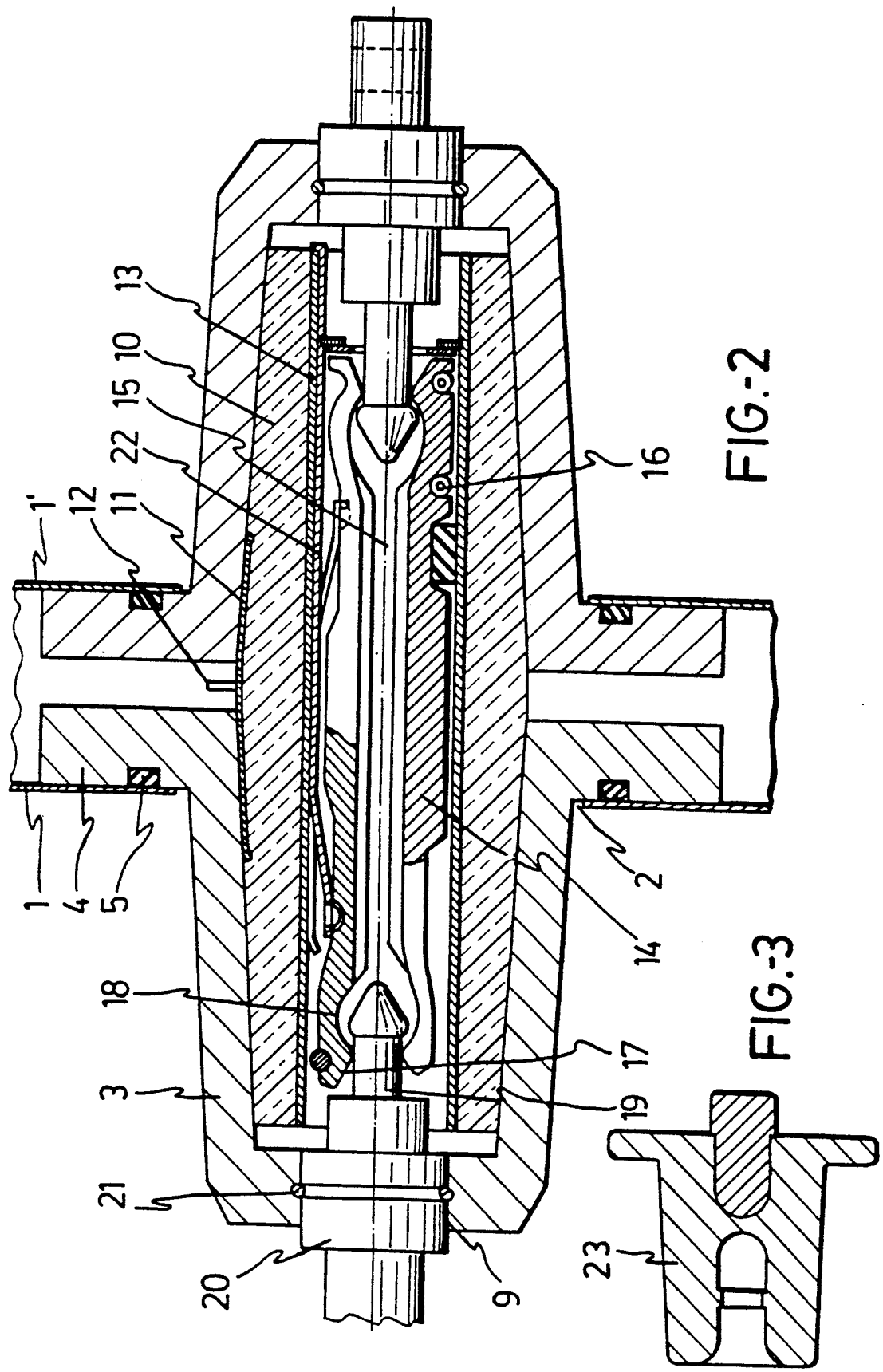

COUPLING SYSTEM FOR ELECTRIC SWITCHGEAR MODULES IN TRANSFORMATION CENTERS AND THE LIKE

BACKGROUND OF THE INVENTION

1. Field of the Invention

The present invention relates to coupling system for modular cells incorporating parts of the control and protective gear in average and low voltage power transformation and distribution stations, which system has been specifically conceived for coupling between such cells to be effected without the latter losing their leakproof characteristics and hence without losing the gas protecting the equipment, they contain in the coupling operation, moreover for the coupling means to be functionally insensitive to pollution.

2. DESCRIPTION OF THE RELATED ART

The use of modules or cells is well-known to house all of the electric units for controlling and protecting power transformation and distribution stations having a wholly leakproof and impervious structure in order for the equipment not to lose its electric characteristics due to environmental contamination and pollution that must be kept constant for the equipment to adequately operate.

The provision inside such cells or modules of a suitable gas, for instance hexafluoride, (SF6) which helps to keep the electrical characteristics of the equipment mounted inside the locker unchanged is also well-known.

This system for protecting all of the units within a leakproof cell with a gas inside is hampered by two significant drawbacks:

On the one hand, the electric equipment or switchgear is almost immovable to the detriment of its versatility in the event if it should be extended.

On the other hand, in the event of breakdown of or damage to one of the units of the equipment it will be necessary to reach into the cell or module for its repair or replacement, which can lead to deterioration in the imperviousness thereof and the release of an insulating gas which protected the whole of the control and protection equipment.

Modular cells are also known, which contain in their interior a functional portion of the equipment and which cells or modules are electrically connected to other adjacent cells or modules which incorporate supplementary functions. The various cells of this sort duly connected altogether determine the control and protection equipment in each case.

It can be inferred from the above that using functional cells or modules is advantageous in that the equipment can eventually be modified, both by extending and reducing the functional structure thereof.

However, a serious drawback is that since the cells or modules are not leakproof, they cannot retain the gas inside and the units they contain can and in fact suffer the adverse climatic or contaminating consequences.

SUMMARY OF THE INVENTION

The coupling system for control cells or modules in transformation centers, power transformation and distribution centers subject of the present invention, relying upon the use of cells or modules housing therewithin parts of the control equipment, fully solves the above-mentioned leakproof problem, allowing an intermodular coupling to take place in perfectly leakproof conditions such that the contents thereof are not only isolated and protected from the environmental effects and weather exposure, but can moreover be assisted by an environmental conditioning gas without the latter being released at any time.

In addition to the leakproof coupling, the system renders the actual means used for electrical coupling functionally insensitive to pollution.

More specifically and in order to achieve the above, the coupling system of the present invention relies upon the establishment in each module of as many holes as couplings must be made with the adjacent module, such holes being located so that, during normal inter-modular coupling, they shall appropriately face each other, each hole being provided with a pan or cover-guard provided at its mouth with an enlargement through which it abuts upon the mouth of the hole, against which it is rendered leakproof with the preferred assistance of an annular sealing gasket and to which it is attached by a flange, whilst the cover-guard body penetrates inside the module. The cover-guard body has at its bottom an axial hole in which a lead tab is provided.

The system is supplemented by an insulating mount designed to be inserted jointly and snugly in two cover-guards that face each other and are provided for two adjacent modules, which insulating mount is tubular in shape, with a slightly imbued or external semi-conductive layer at its mid-point that in turn has a rim over its perimeter through which the said semi-conductive layer can be connected to earth.

Inside the insulating mount is a metal tubing duly attached to the mount with the conductor as such inside and comprising a number of conductive parts disposed at the generatrix of an imaginary cylindrical surface in turn defining an axial duct upon which the conductive parts tend to close by action of springs or coils clamping the same.

In order to ensure that the insulating mount is joined to the metal tubing, the former could be provided with a semi-conductive layer (not shown) upon the surface in contact with the metal tubing.

Furthermore, and as aforesaid, the bottom of each pan or cover-guard has a conductive tab, mounted upon the relevant insulating mount that is fixed at the hole on the bottom of the cover-guard and in respect of which it is sealed using an annular sealing gasket, or adequate means. The conductive tab receives at its inner end the relevant conductor and its outer end is inserted in the housing defined by the group of above-mentioned conductive parts, between which it penetrates against the resilient stretch of the springs or coils with which they are provided.

This group of conductive parts is moreover established within the metal tubing with the assistance of a number of elastic bands that allow the conductive assembly a certain mobility, in order for the conductive tabs to fit in snugly.

Finally, it only remains to be said that the structure described is provided with stoppers that allow the cover-guards or pans to be sealed when they are not used as means for intermodular connection.

BRIEF DESCRIPTION OF THE DRAWINGS

In order to provide a detailed description of this invention, a set of drawings is attached to the specification which, while purely illustrative and not fully comprehensive, shows the following:

FIG. 2 is a cross-section view of FIG. 1, showing therein all of the elements which make up the system; and FIG. 3 is a cross-section view of one of the stoppers used when electrical connection with another module is not required in any of the cover-guards or pans.

DESCRIPTION OF THE PREFERRED EMBODIMENT OF THE INVENTION

Figure 1:
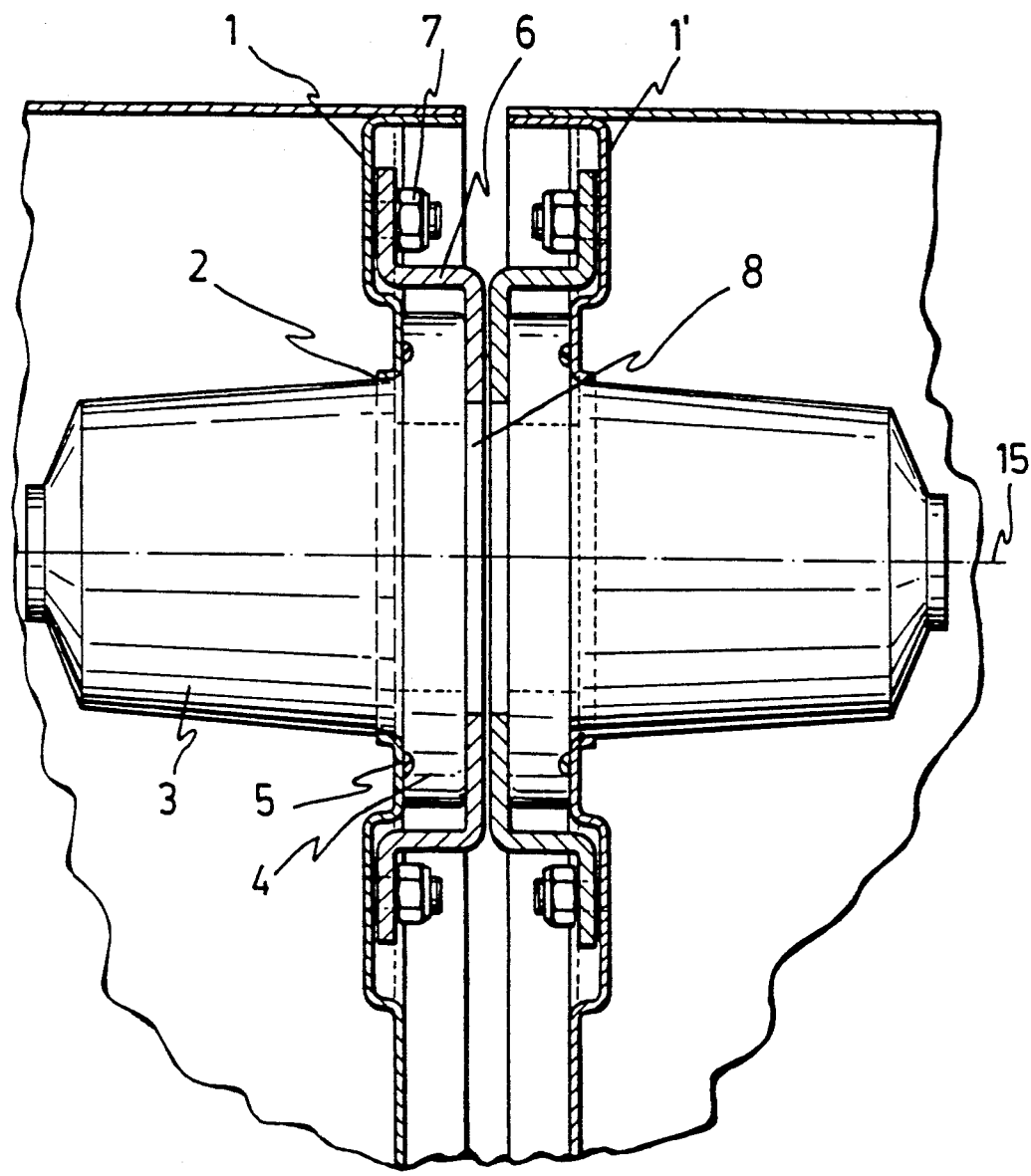
FIG. 1 is a partial side elevation view of two switchgear modules for transformation centers joined by means of the coupling system of the present invention.

In FIGS. 1 through 3, numbers 1 and 1' are allocated to two switchgear modules designed to be coupled and connected to each other at a transformation center and, in accordance with the coupling system. Each of the modules is provided with a hole 2 at each interconnection point into which a preferably cup-shaped pan or cover-guard 3 can be fitted. A larger base of the pan is open and has an enlargement or portion of a greater diameter 4 provided with a groove for an O-ring joint 5 to be fitted therein. The pan or cover-guard 3 is fitted to the module body 1 with the assistance of a flange 6 which is screwed by screws to the respective module, and which is provided with a wide central hole 8 operatively facing the mouth of the cover-guard 3. The cover-guard is designed to be largely inserted inside the module 1 and is, at the same time, provided at its smaller or inner base with a hole 9 coaxial with the mouth but with a smaller diameter.

The holes 2 into which the cover-guards or pans 3 are inserted are located in the modules 1-1' such that upon the coupling of such modules, as shown in FIGS. 1 and 2, the cover-guards 3 face each other coaxially.

The coupling system is supplemented with an insulating mount 10 comprising two tapered sectors opposing each other that can respectively be inserted into the two facing cover-guards or pans 3. The insulating mount 10 is tubular in shape and provided at the mid-point of its outer or slightly imbued face with a semi-conductive layer 11 whose center is in turn provided with an outwardly projecting rim 12 through which the semi-conductive layer 11 is connected to earth. The interior of the insulating mount 10 carries a metal tubing 13 which projects through the two free ends thereof and which constitutes a housing for the conductive elements 14 specifically comprising a number of metallic conductive elements or 14 parts which are as aforesaid disposed at the generatrix of an imaginary cylindrical surface and which tend to clamp themselves about an axis 15 of the assembly with the assistance of springs or coils 16.

The conductive elements or parts 14 have bevelled front portions 17 just before round recesses 18 in order to facilitate access into the same of two tabs 19 that project from the front end of a contactor 20 mounted on the hole 9 of the smaller base of the cover-guard 3. An 0-ring seal 21 or any other suitable means is provided to help seal the assembly.

The conductive elements 14 have also been provided to be duly positioned within the metal tubing 13 by using elastic 22 such that the conductive assembly can swivel somewhat laterally with respect to the axis 15 of the assembly, in order to achieve a perfect fit for the conductive tabs 19 in the event of potential slight axial misalignments between the cover-guards or pans 3 in mounting the modules 1-1'.

Modules shall naturally exist wherein one or more of the cover-guards or pans 3 shall be inoperative, for instance in expectation of adding new modules, in which case the cover-guards are sealed with a stopper 23, for instance as shown in detail in FIG. 3, though the stopper is merely illustrated as an example and can be replaced with any other stopper.

In accordance with the structure described, the coupling system for electric switchgear modules in transformation centers subject of the invention, in addition to allowing any extension of the equipment by furnishing new modules, is insensitive to pollution and adverse environmental conditions, ensuring that the inter-modular connection is sealed and, given the conductive assembly's buoyancy, that potential maladjustments or misalignments in facing the conductive tabs 19 in two adjacent modules are offset.

It is believed that the device has now been sufficiently described for one skilled in the art to have grasped the full scope of the invention and the advantages it offers.

The materials, shape, size and layout of the elements may be altered provided that this entails no modification of the essential features of the invention.

The terms used to describe the invention herein should be taken to have a broad rather than a restrictive meaning.

I claim:

1. An electric switchgear system comprising modules electrically connected in transformation centers, each module having a hole which faces the hole of an adjacent module, the system further comprising cup-shaped cover-guards each having a base portion and an enlarged portion opposite to said base portion and each being fitted in each said hole so that two enlarged portions of two cover-guards fitted in two adjacent coupled modules face each other; flange members retaining said cover-guards to said modules; sealing gaskets sealing said enlarged portions to walls of said adjacent modules, each over-guard having a hole in the base portion thereof; tow contactor elements each terminating with a conductive tab and being fixed in said hole in the base portion of the respective cover-guard each tab being positioned inside the respective cover-guard; means on each contactor element for sealing the respective conductive tab inserted in the cover-guard, the conductive tabs inserted in the two cover-guards of the two adjacent modules extending towards each other and coaxially facing each other, the conductive tabs being electrically connected by connecting means.

2. The coupling system according to claim 1, further comprising a tubular insulating mount formed of two axially outwardly tapering portions each inserted into the respective one of the two adjacent cover-guards so a to couple said cover-guards and the respective modules thereof together, said mount having on an outer periphery thereof a conductive slightly imbued layer provided with a rim portion radially outwardly projecting therefrom and formed to be connected to ground, said mount having a hollow interior; said connecting means further including an elongated metal tubing member positioned in and running through said interior; a plurality of conductive elements positioned in said tubing member and extending along an axial of elongation of said tubing member, said conductive elements having end portions positioned in contact with the respective conductive tabs; springs provided on and acting upon said conductive elements to hold said conductive elements about a central axis of the coupling system, and elastic bands provided on said conductive elements and resting against an inner wall of said tubing member to permit said conductive elements to laterally displace so as to offset potential misalignments of said coaxially facing tabs, said tubing member enclosing said tabs, said conductive elements, said springs and said elastic bands.

3. The coupling system according to claim 1, and further comprising toppers, each stopper replacing the respective contactor element and sealing the respective cover-guard when electrical connection of one module to another module is not required.

* * * * *